United States Patent [19]

Hutter

[11] Patent Number: 5,088,851

[45] Date of Patent: Feb. 18, 1992

[54] DOWEL FASTENING DEVICE

[76] Inventor: Gerhard Hutter, 993 Lake Ave., Greenwich, Conn. 06830

[21] Appl. No.: 591,262

[22] Filed: Oct. 1, 1990

[51] Int. Cl.$^5$ .............................................. B25G 3/00
[52] U.S. Cl. ...................................... 403/14; 403/298
[58] Field of Search ........................ 403/298, 292, 14

[56] References Cited

U.S. PATENT DOCUMENTS

| | | | |
|---|---|---|---|
| 3,284,113 | 11/1966 | Howell | 403/298 X |
| 3,899,258 | 8/1975 | Matthews | 403/292 |
| 4,454,699 | 6/1984 | Strobl | 411/510 X |
| 4,609,170 | 9/1986 | Schnabl | 411/451 X |
| 4,633,640 | 1/1987 | Hutter | 52/704 |
| 4,963,051 | 10/1990 | Hutter | 403/298 |

FOREIGN PATENT DOCUMENTS

| | | | |
|---|---|---|---|
| 6504715 | 10/1965 | Netherlands | 248/71 |
| 428420 | 5/1935 | United Kingdom | 411/456 |

Primary Examiner—Andrew V. Kundrat
Attorney, Agent, or Firm—Alfred E. Miller

[57] ABSTRACT

A dowel fastening support device for insertion into a bored hole of a structural element having a support member outside the bored opening and an elongated shank having pivotable triangular-shaped gripping members for insertion in said bored hole, said gripping members being so configured that the forward edge of each member is spaced from the adjacent interior surface of said bored hole, and the device is provided with a pointed element at the end of the shank remote from the support end portion for automatically centering the dowel device, when the latter is inserted in said bored opening.

4 Claims, 1 Drawing Sheet

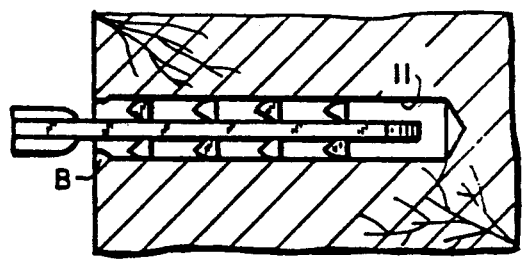
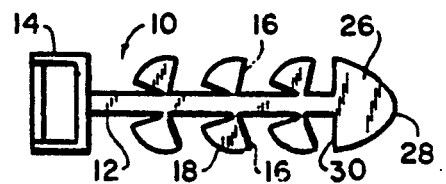
FIG.1 PRIOR ART
FIG.2
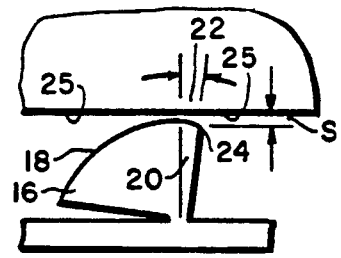
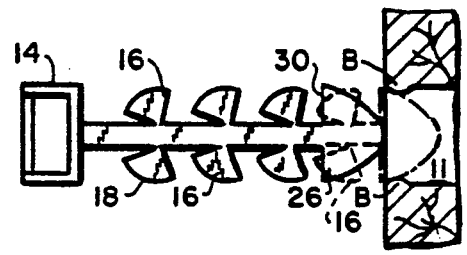
FIG.3
FIG.4
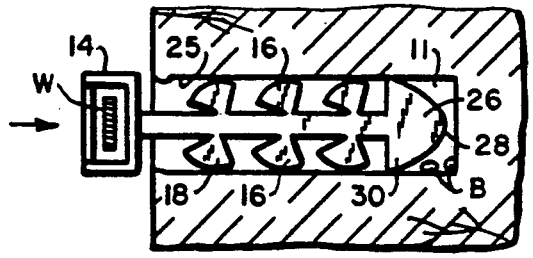
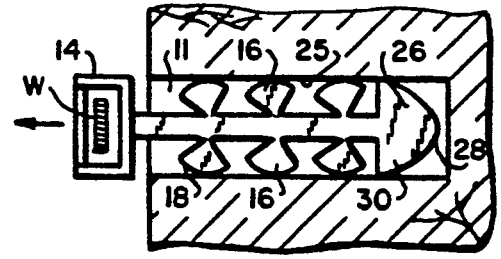
FIG.5
FIG.6

DOWEL FASTENING DEVICE

The invention relates to a dowel fastening device for drilled holes in wood, masonry, plasterboard or other similar stable surfaces. Each of the wall anchor fastening devices is provided with a shank portion and a plurality of spaced, triangular shaped members having curved gripping surfaces which frictionally engage the internal walls of the bored hole, when force is applied in the direction away from the hole. The dowel device may be fabricated of a thermoplastic, or any other suitable material, and the triangular shaped members are affixed to the shaft by means of a thin hinge member so that the members can be pivoted forward and backward, depending upon the direction of the force applied to the shank member.

The present device, as described above, is the type shown in my U.S. Pat. No. 4,633,640, which was issued on Jan. 6, 1987, as well as my co-pending U.S. application Ser. No. 375,280, filed on July 30, 1989 now U.S. Pat. No. 4,963,051.

While the above prior art devices perform satisfactorily, the present invention represents an improvement since it has been observed that on many occasions when the installer of electrical or telephone wiring drills a hole for a wiring support member, especially in wood, a circular burr can result at the periphery of the hole opening. This condition prevent the dowel from being centered in the hole as it is being inserted therein, and results in the necessity of using additional effort and time in order to properly insert the dowel in the drilled hole. The present dowel fastening device construction overcomes that drawback since it automatically centers the dowel in the drilled hole, whether the hole is drilled in wood, sheetrock or wallboard, masonry, or any other structural material. It has been noted that due to the crumbling nature of gypsum plasterboard, a wall of this type, when drilled, will easily disintegrate in sections around the hole opening so that an automatic centering of the dowel is a necessity in order to ensure that the dowel is properly inserted within the bored hole.

It is an object of the present invention to provide a plurality of pivotable triangular shaped members on an elongated shank element for gripping the inner surfaces of a drilled hole in which the gripping surfaces are curvilinear, and each member is provided with an additional triangular piece at the forward edge thereof, having a width adjacent to the curvilinear forward edge of the pivotable member of approximately 1/16 of an inch.

Another object of the present invention is to provide an entrance spade at the forward edge of the shank portion to ensure that the dowel device is properly centered within the bored hole.

In order that the present invention will be more clearly understood, it will now be disclosed in greater detail with reference to the accompanying drawings in which:

FIG. 1 a side elevational view of a prior art dowel.

FIG. 2 is a side elevational view of the dowel fastening device constructed according to the teachings of my invention.

FIG. 3 is an enlarged fragmentary elevational view of one of the triangular shaped pivotable members which is connected by a thin hinge to an elongated shank member.

FIG. 4 is a side elevational view of the dowel device being inserted in a drilled hole in wood or any other suitable structural material and having a circular burr at the periphery of the opening.

FIG. 5 is a view similar to FIG. 4, however with a force being applied to the dowel device in the direction toward the bored hole, and FIG. 6 is a view similar to FIG. 5, however with the force being applied to the dowel device in the direction away from the bored hole.

DESCRIPTION OF THE PREFERRED EMBODIMENT

Referring to FIG. 1 in which the prior art construction of a dowel fastening and support device is shown, and FIG. 2 shows the dowel fastening device support member for wiring constructed in accordance with the present invention, and referred to by the numeral 10. The device is shown having an elongated shank portion 12, and a wire retaining loop 14. It should be apparent that these dowel fastening and wire support devices are placed in the wall to thereby secure the wires W in the proper locations. In order to accomplish this, holes in the form of bores 11 must be drilled in either wood, plasterboard, or masonry surfaces for insertion of the dowels at the selected locations.

As has been noted hereinbefore, on many occasions, the installer of electrical or telephone wiring drills a hole, for example in wood, which results in a circular burr B at the periphery of the hole opening. It is known that it is essential to insert the dowel device centrally within the hole in order to prevent the dowel device from being hung up or impeded at the entrance of the drilled hole, which consequently requires the removal of the dowel device and at least one further attempt at re-insertion of the dowel device in the drilled hole centrally so that the dowel device can be fully inserted in the hole. When this is accomplished, a more reliable support member for the wiring is the result. In order to overcome this problem the dowel shank member is provided with a plurality of oppositely disposed triangular shaped members 16 having curved gripping surfaces 18. However, the edge at the intersection of the curved gripping surfaces and the adjacent linear, substantially vertical, surface will often engage the burr B as shown in the prior art construction of FIG. 1, and the dowel will be prevented from further penetrating the drilled hole.

In order to overcome this troublesome problem an additional triangular segment 20, as seen in FIG. 3, is added to each of the triangular members 16. The segment 20 is further provided with a curvilinear gripping surface 22 in which the edge 24 is spaced from the burr as seen in FIG. 3, and is also spaced S from the adjacent interior wall sur face 25 of the bore. Consequently, the triangular shaped members, when inserted in the bore as seen in FIG. 4, do not engage the burr B or bite into the internal surface 25 of the bore while being inserted in the hole, as seen in FIG. 5.

As seen in FIGS. 1, 3, and 4 the forward end of the dowel device is provided with a spade 26 having a rounded front end 28 and a rear section 30 of the diameter being slightly less than the diameter of the bore 11. It should be apparent that the spade 26, when inserted in the bore 11, will automatically center the dowel fastening device within the bore so that the installer can rapidly and reliably fully insert the dowel device in the respective drilled hole.

Although the present invention has been disclosed and described with reference to a single embodiment, it should be apparent that other variations and modifications may be made, and it is intended in the following claims to cover each said variation and modification as follows within the true spirit and scope of the invention.

I claim:

1. A dowel fastening support device for insertion in a board opening in a structural element comprising a support end portion and a shank portion, a plurality of triangular-shaped members each having a curved gripping surface and two straight side surfaces, a hinge joint for each member connecting the adjacent ends of said two straight side surfaces to said shank portion whereby said members are pivotable in one direction when said shank is inserted in said opening, and when force is applied to said dowel fastening support in a direction away from said structural element said curved surfaces pivot in the opposite direction to frictionally grip the interior surfaces of said opening to thereby prevent the dowel fastening support from being dislodged from said structural element, each of said curved gripping surfaces having a configuration whereby the forward edge thereof at the junction of said curved gripping surfaces and adjacent straigth side is spaced from said interior surface when said device is inserted in said bored opening, and a spade-shaped element having forward curved surfaces and a rear linear surface connected to the forward end of said shank portion, the distance between the junctions of the forward and rear surfaces on said spade-shaped element corresponding substantially to the interior diameter of said bored opening whereby said dowel is automatically centered when inserted in said bored opening.

2. A dowel fastening support device as claimed in claim 1 wherein said support end portion is a loop.

3. A dowel fastening support device as claimed in claim 1 wherein the periphery of the bored opening has a burr, said forward edge of said triangular-shaped members and said spade-shaped element being spaced from said burr upon insertion of the dowel fastening support device in said bored opening.

4. A dowel fastening and wire support device for insertion in a bored opening in a structural element comprising a support end portion and a shank portion, a plurality of triangular-shaped members each having a curved gripping surface and two straight side surfaces, a hinge joint for each member connecting the adjacent ends of said two straight side surfaces to said shank portion whereby said members are pivotable in one direction when said shank is inserted in said opening, and when force is applied to said dowel fastening support in a direction away from said structural element said curved surfaces pivot in the opposite direction to frictionally grip the interior surfaces of said opening in thereby prevent the dowel fastening support from being dislodged from said structural element, each of said curved gripping surfaces having a configuration whereby the forward edge thereof at the junction of said curved gripping surface and adjacent straight side is spaced from said interior surfaces of said opening when said device is inserted in said bored opening, a spade shaped element having forward curved surfaces and a rear linear surface connected to the forward end of said shank portion, the distance between the junctions of the forward and rear surfaces on said spade-shaped element corresponding substantially to the interior diameter of said bored opening whereby said dowel device is automatically centered when inserted in said bored opening, and a support end portion remote from said spade-shaped element being a wire retaining member.

* * * * *